United States Patent
Katine et al.

(10) Patent No.: US 8,351,151 B2
(45) Date of Patent: Jan. 8, 2013

(54) THERMALLY ASSISTED MAGNETIC WRITE HEAD EMPLOYING A NEAR FIELD TRANSDUCER (NFT) HAVING A DIFFUSION BARRIER LAYER BETWEEN THE NEAR FIELD TRANSDUCER AND A MAGNETIC LIP

(75) Inventors: Jordan A. Katine, Mountain View, CA (US); Vijay P. S. Rawat, San Jose, CA (US); Neil L. Robertson, Palo Alto, CA (US); Barry C. Stipe, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 3 days.

(21) Appl. No.: 12/938,234

(22) Filed: Nov. 2, 2010

(65) Prior Publication Data
US 2012/0105996 A1 May 3, 2012

(51) Int. Cl.
G11B 5/127 (2006.01)
G11B 13/08 (2006.01)
(52) U.S. Cl. .................................. 360/110; 369/13.33
(58) Field of Classification Search .............. 360/110; 369/13.01, 13.33, 13.13, 112.01, 112.29
See application file for complete search history.

(56) References Cited

U.S. PATENT DOCUMENTS

| | | | | |
|---|---|---|---|---|
| 5,831,792 A * | 11/1998 | Ananth | ............ | 360/236.6 |
| 5,949,622 A * | 9/1999 | Kamiguchi et al. | ...... | 360/324.12 |
| 5,986,858 A * | 11/1999 | Sato et al. | ............ | 360/324.2 |
| 6,721,138 B1 * | 4/2004 | Chen et al. | ............ | 360/317 |
| 6,792,021 B1 | 9/2004 | Suzuki | | |
| 6,956,716 B2 | 10/2005 | Lille | | |
| 6,982,932 B2 * | 1/2006 | Sakakima et al. | ......... | 369/13.17 |
| 7,310,205 B2 | 12/2007 | Hsu et al. | | |
| 7,372,648 B2 | 5/2008 | Akiyama et al. | | |
| 7,518,815 B2 | 4/2009 | Rottmayer et al. | | |
| 7,538,978 B2 | 5/2009 | Sato et al. | | |
| 7,652,954 B2 | 1/2010 | Fontana, Jr. et al. | | |
| 7,880,996 B2 * | 2/2011 | Stipe | ............... | 360/59 |
| 8,031,561 B2 * | 10/2011 | Hellwig et al. | ............ | 369/13.01 |
| 8,059,374 B2 * | 11/2011 | Zhao et al. | ................ | 360/324.2 |
| 2002/0015269 A1 * | 2/2002 | Iwasaki et al. | ........... | 360/324.12 |
| 2004/0086885 A1 * | 5/2004 | Lee et al. | ........... | 435/6 |
| 2006/0028764 A1 * | 2/2006 | Lille | ............ | 360/126 |
| 2006/0275757 A1 * | 12/2006 | Lee et al. | ........... | 435/6 |
| 2007/0139818 A1 | 6/2007 | Shimazawa et al. | | |
| 2007/0184307 A1 * | 8/2007 | Lee et al. | ...................... | 428/829 |

(Continued)

FOREIGN PATENT DOCUMENTS
JP 2003/006803 A 1/2003
(Continued)

Primary Examiner — Allen Cao
(74) Attorney, Agent, or Firm — Zilka-Kotab, PC

(57) ABSTRACT

A thermally assisted magnetic write head having a near-field transducer, a magnetic lip and a diffusion barrier layer between the near-field transducer and the magnetic lip. The near-field transducer includes a transparent aperture constructed of a material such as $SiO_2$ and an opaque metallic antenna constructed of a metal such as Au formed at a first edge of the aperture. A magnetic lip, connected with the write pole is formed near a second edge of the aperture with a diffusion barrier layer being disposed between the magnetic lip and the aperture. The diffusion barrier layer prevents migration of atomic between the aperture and the magnetic lip, thereby ensuring robust performance at localized high temperatures generated by the near-field transducer.

24 Claims, 9 Drawing Sheets

U.S. PATENT DOCUMENTS

| | | | | |
|---|---|---|---|---|
| 2007/0242396 | A1* | 10/2007 | Shimazawa et al. | 360/324.12 |
| 2008/0112079 | A1* | 5/2008 | Fullerton et al. | 360/123.02 |
| 2008/0274381 | A1* | 11/2008 | Fullerton et al. | 428/846.3 |
| 2008/0278864 | A1* | 11/2008 | Zhang et al. | 360/324.12 |
| 2009/0073858 | A1 | 3/2009 | Seigler et al. | |
| 2009/0219638 | A1 | 9/2009 | Iwata et al. | |
| 2010/0002330 | A1 | 1/2010 | Lille | |
| 2010/0060977 | A1 | 3/2010 | Karalis et al. | |
| 2010/0061200 | A1 | 3/2010 | Shimazawa et al. | |
| 2010/0165499 | A1* | 7/2010 | Stipe | 360/59 |
| 2010/0165802 | A1* | 7/2010 | Stipe | 369/13.13 |
| 2010/0177449 | A1* | 7/2010 | Zhao et al. | 360/324.12 |
| 2011/0096431 | A1* | 4/2011 | Hellwig et al. | 360/59 |
| 2012/0009337 | A1* | 1/2012 | Zhang et al. | 427/131 |
| 2012/0045662 | A1* | 2/2012 | Zou et al. | 428/810 |

FOREIGN PATENT DOCUMENTS

| | | |
|---|---|---|
| JP | 2006/351091 A | 12/2006 |
| JP | 2007/052918 A | 3/2007 |

\* cited by examiner

THERMALLY ASSISTED MAGNETIC WRITE HEAD EMPLOYING A NEAR FIELD TRANSDUCER (NFT) HAVING A DIFFUSION BARRIER LAYER BETWEEN THE NEAR FIELD TRANSDUCER AND A MAGNETIC LIP

FIELD OF THE INVENTION

The present invention relates to heat assisted magnetic recording, and more particularly to a magnetic write head having a near field transducer placed proximate to the magnetic write pole lip. The magnetic write pole lip is separated from the near-field transducer by a diffusion barrier layer to prevent atomic diffusion between the magnetic lip and the aperture material.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

Magnetoresistive sensors such as GMR or TMR sensors are employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current there-through. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

The write head can be a perpendicular magnetic recording head that records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

A heating element can be incorporated into the write head in order to allow a further decrease in bit size and therefore allow a corresponding increase in data density. In order to write ever smaller bits of data, the magnetic coercivity must be increased, in order to prevent the extremely small bit from becoming demagnetized after the data has been written. Locally heating the media during writing of data momentarily reduces the coercivity of the media allowing the data to be written to the high coercivity media.

SUMMARY OF THE INVENTION

The present invention provides a thermally assisted magnetic write head that includes a magnetic lip and a heating device. The heating device can include a near field transducer, such as a plasmonic antenna or a transparent aperture. A diffusion barrier layer is sandwiched between the near field transducer and the magnetic lip.

The heating device can be a plasmonic heating device that includes an opaque, metallic plasmonic antenna and an aperture adjacent to the plasmonic antenna. A magnetic lip structure can be disposed opposite the plasmonic antenna, such that the aperture is between the magnetic lip structure and the plasmonic antenna. A diffusion barrier layer can be sandwiched between the antenna/aperture and the magnetic lip structure.

The presence of the diffusion barrier layer between the aperture and the magnetic lip advantageously prevents the migration of atoms between the aperture and the magnetic lip during the high temperatures generated by the plasmonic heating device. This ensures robust operation and high performance of the write head in several ways. For example, preventing this interdiffusion avoids an unwanted increase in effective spacing between the writing edge of the magnetic lip and the antenna/aperture interface that generates the heat for the thermally assisted recording. In addition, preventing such interdiffusion ensures that the optical properties of the aperture are maintained.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
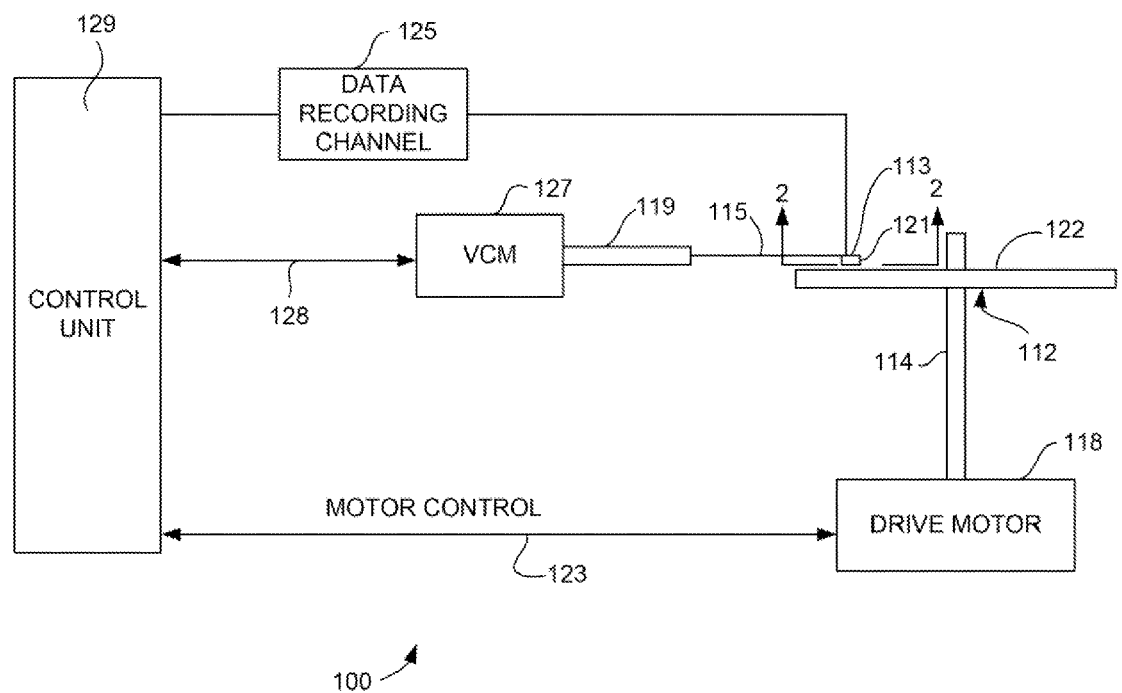
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, the slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
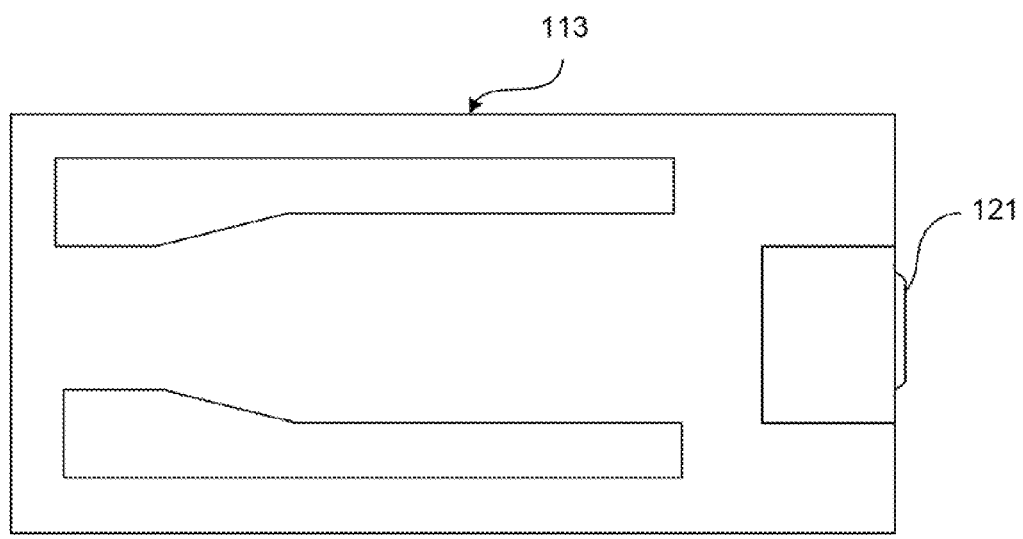
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
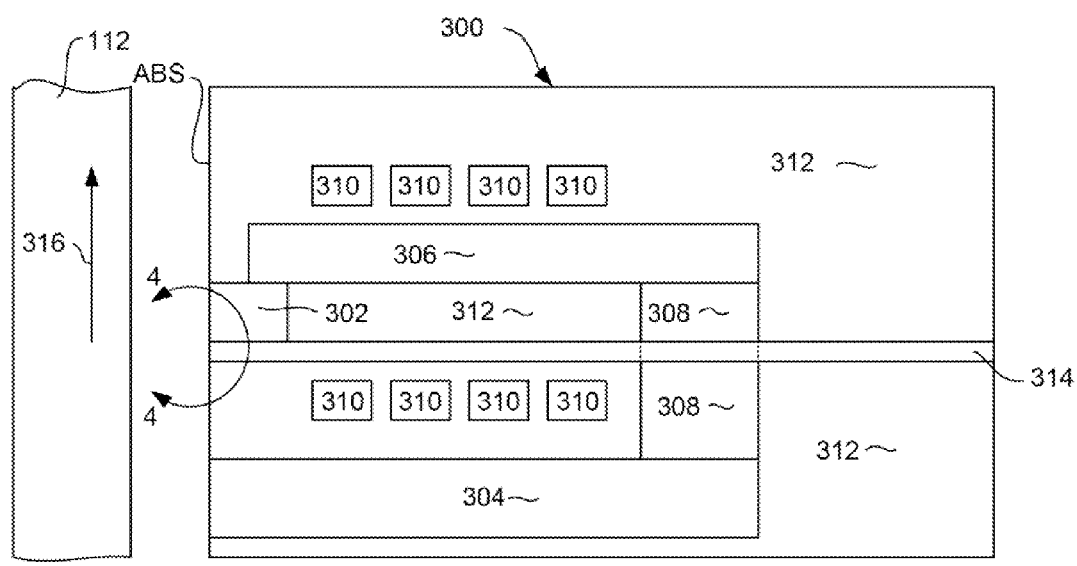
FIG. 3 is a side cross sectional view of a magnetic write head according to an embodiment of the present invention.

With reference now to FIG. 3, a write head 300 is described, which may be incorporated into a magnetic head such as head 121 shown in FIG. 2. The write head 300 can include a write pole 302 that extends to an air bearing surface (ABS) and a magnetic return pole 304. The return pole 304 has a cross section at the ABS that is larger than the cross section of the write pole 302 at the ABS. The write pole 302 can be connected with a shaping layer 306 in a region removed from the ABS. A magnetic back gap layer 308 connects the shaping layer 306 with the return pole 304 in a region removed from the ABS, thereby magnetically connecting the write pole 302 with the return pole 304 in a region removed from the ABS. The write pole 302, return pole 304, shaping layer 306 and back gap 308 are all constructed of a magnetic material such as NiFe or CoFe. The write pole 302 is also constructed of a magnetic material and is preferably constructed of a lamination of layers of high magnetic moment material such as CoFe separated by thin layers of non-magnetic material.

An electrically conductive write coil 310, shown in cross section in FIG. 3, passes between the write pole 302 and the return pole 304 and may also pass beneath the write pole 302. The write coil 310 can be constructed of a non-magnetic, electrically conductive material such as Cu and can be embedded in a non-magnetic, electrically insulating material such as alumina 312.

With continued reference to FIG. 3, a heating device 314 can be provided adjacent to the write pole 302 for locally heating the magnetic media 112. The heating device 314 can pass through an opening within the back gap layer 308 so that it can extend beyond the back gap layer 308. The magnetic media 112 travels in a direction indicated by arrow 316 relative to the write head 302. Therefore, as can be seen, the heating device 314 is upstream from the write pole 302, or in other words is in a leading direction relative to the write pole 302. The heating device 314 locally heats the magnetic media 112 in a region just upstream from the write pole 302, which momentarily reduces the coercivity of the magnetic media. This greatly facilitates writing to a magnetic media which has an otherwise too high coercivity to be written to. In order for the heating device 314 to effectively function, it must be located as close as possible to the write pole. In addition, the heating device 314 must heat only a very small area on the media 112 in order to avoid demagnetizing adjacent tracks of data or downstream data on the same track.

Figure 4:
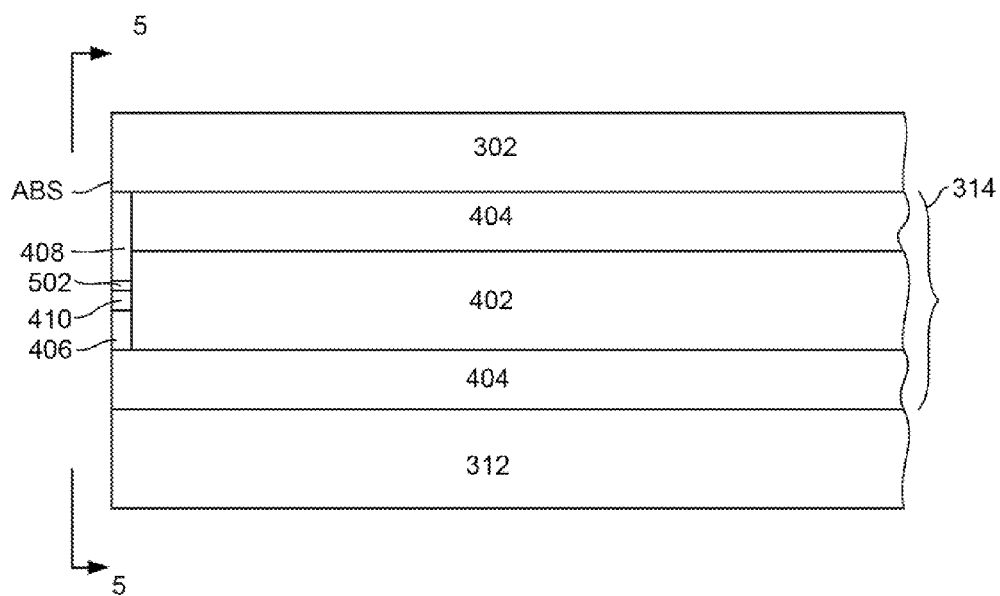
FIG. 4 is an enlarged view of a portion of the magnetic write head as taken from circle 4-4 of FIG. 3.
Figure 5:
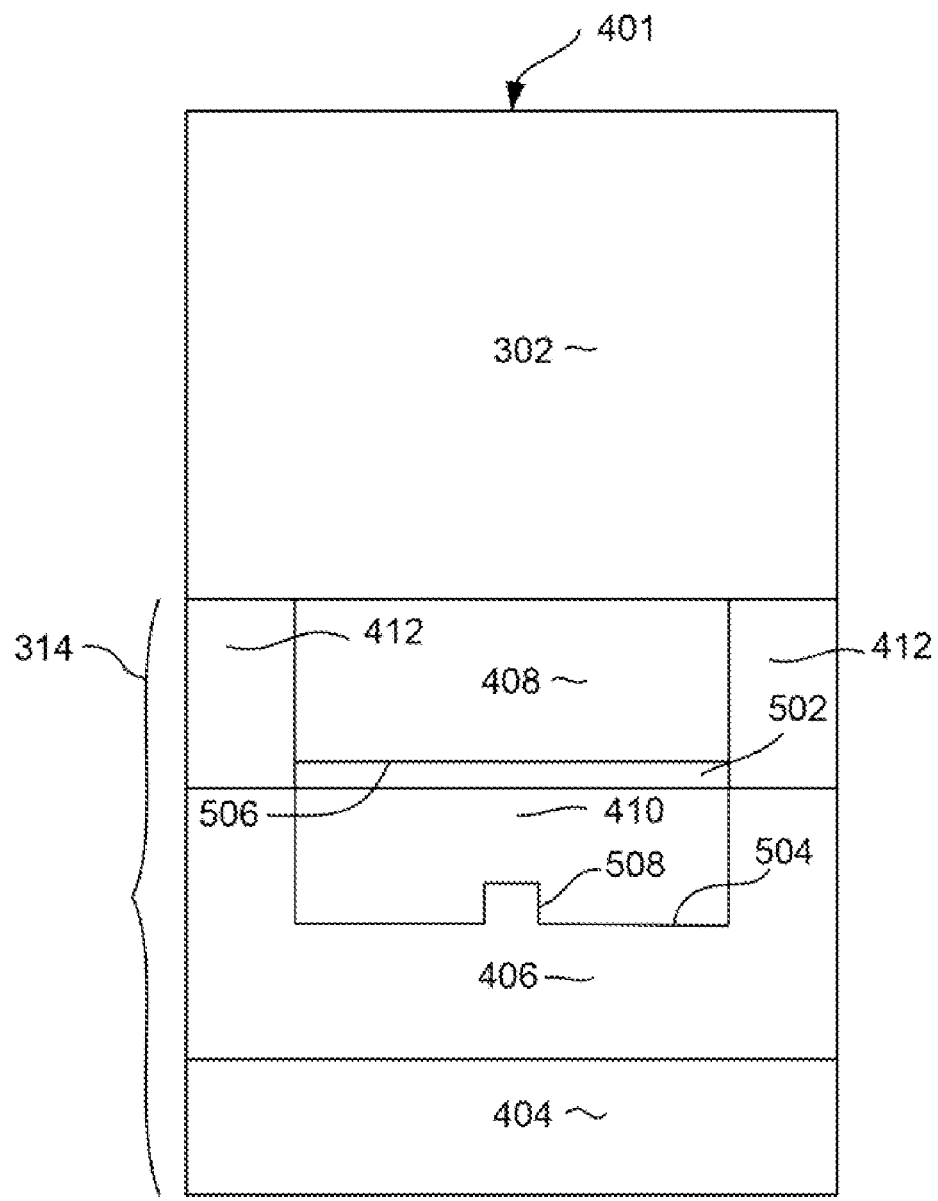
FIG. 5 is an ABS view of a portion of the write head as seen from line 5-5 of FIG. 4.

One example of a heating element that is particularly suited to use as a heating device in a magnetic recording system is a plasmonic heating device. FIG. 4 shows an enlarged view of a portion of a plasmonic heating device 314, as seen from circle 4 of FIG. 3. FIG. 5 shows an ABS view of the structure shown in FIG. 4, as seen from line 5-5 of FIG. 4. With reference to FIG. 4, the plasmonic heating device 314 includes a light waveguide 402, which can be constructed of an oxide such as Tantalum oxide ($Ta_2O_5$), titanium oxide ($TiO_2$), niobium oxide ($Nb_2O_5$), zirconium oxide ($ZrO_2$), lanthanum oxide ($La_2O_3$), Yttrium oxide ($Y_2O_3$), scandium oxide ($Sc_2O_3$) or a binary, ternary or quaternary combination of these oxides. The wave guide 402 can also be constructed of oxynitrides such as silicon oxynitride (SiOxNy), tantalum oxynitride (TaOxNy), titanium oxynitride (TiOxNy) and zirconium oxynitride (ZrOxNy).

The waveguide 402 is surrounded by a cladding material 404, which can be a material such as alumina. The plasmonic heating device 314 also includes an opaque metal antenna 406 located at the ABS. A magnetic, metallic lip 408 may extend from the write pole 302 toward an aperture 410 formed between the magnetic lip 408 and the antenna 406.

The antenna 406, magnetic lip 408 and aperture 410 can be seen more clearly with reference to FIG. 5, which shows an ABS view of the structure as seen from line 5-5 of FIG. 4. Side portions 412, at either side of the magnetic lip 408 can be constructed of cladding material similar to or the same as the cladding material 404. Alternatively, antenna 406 can extend up the sides of the lip 408 so that the side portions 412 are constructed of the same material as the antenna 406.

With continued reference to FIG. 5, a plasmonic antenna 406 is formed adjacent to the aperture 410, forming an interface 504 there-between. The plasmonic antenna 406 can be constructed of a metallic material such as Au, Ag, Cu or Rh. The magnetic lip 408 is magnetically connected with the write pole 302 and functions magnetically as a part of the write pole 302. The magnetic lip 408 is constructed of a magnetic metal such as a binary or ternary compound containing Co, Fe, Cr and or Ni (e.g. CoFe, CoFeCr, CoFeNi), and the leading most edge 506 functions as the writing edge of the lip 408. The aperture 410 is constructed of a low refractive index dielectric material such as SiOx, SiOxNy, $Al_2O_3$ or some other similar dielectric having a refractive index less than 1.75.

When light travels through the wave guide 402 (FIG. 4), a plasmonic wave is formed at the junction 504 between the antenna 406 and the aperture 410. The junction 504 between the antenna 406 and the aperture 410 is formed with a notch 508. This notch 508 is designed to form nodes in the plasmonic wave at desired locations.

Laser light is incident on the waveguide cross-section at the flex side of the slider and the light is carried and delivered by the waveguide 402 at the "E" shaped plasmonic antenna 406. The light impinging at the metal-dielectric interface 504 has its polarization parallel to the notch and thus creates a resonant plasmonic wave. The broad "wing" regions of the "E" shaped antenna 406 act as charge reservoirs and hence, set up the boundary condition. The space charge concentration is increased at the sub-100 nm dimension notch 508 of the antenna 406 as compared to the rest of the antenna due to a "lightning rod" effect. This concentration of light energy at sub-wavelength dimensions leads to generation of a hot spot at the notch 508. This hot spot is used to locally heat the magnetic medium 112 (FIG. 3) to temporarily lower the magnetic coercivity at that location. The hot spot heats the media 112 in an extremely focused and small area of the media, smaller and more focused than would be possible using any other heating method.

This concentration of light energy at the plasmonic antenna leads to heating up of the plasmonic antenna 406, the aperture 410 and the magnetic lip 408. In absence of the present invention, this extreme heating would cause inter-diffusion between the $SiO_2$ aperture 410 and the magnetic lip 408. This inter-diffusion would cause degradation in the performance of the write head 300. For example, the spacing between interface 504 of the plasmonic device and the edge 506 of the magnetic lip 408 would increase due to compromised magnetic properties of the leading edge of the magnetic lip. This would therefore lead to an increase in the distance between the magnetic writing and the heat source. Also, the optical properties of the $SiO_2$ would be changed due to the diffusion of metallic atomic into it.

The presence of a thin diffusion barrier layer 502 advantageously prevents this interdiffusion between the aperture material 410 and the lip material 408 without dramatically increasing the spacing between the magnetic lip and the plasmonic antenna notch. The desired characteristics of the diffusion barrier layer 502 is that it should have low oxygen diffusivity to prevent oxygen diffusion from the aperture 410 into the magnetic lip 408 while also preventing Co, Fe, Ni and/or Cr from migrating from the magnetic layer 408 into the aperture 410. The diffusion barrier 502 should exhibit no chemical reactivity with Si, O, Co, Fe, Cr or Ni. It should also exhibit good adhesion with the $SiO_2$ of the aperture 410 and also with the magnetic material of the lip 408 even at elevated temperatures. It should also be thin enough that it does not significantly increase the spacing between the magnetic lip 408 and the antenna notch 508.

Figure 6:
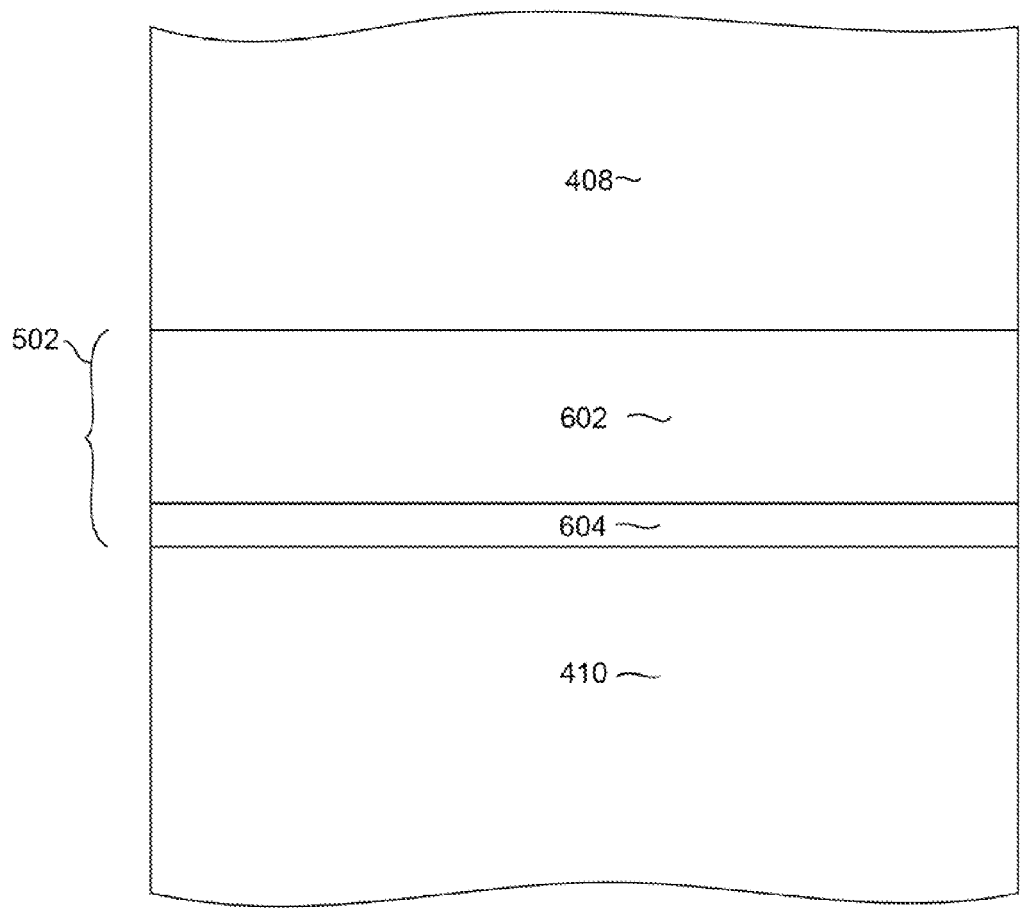
FIG. 6 is an enlarged view showing a diffusion barrier layer structure according to an embodiment of the invention.
Figure 7:
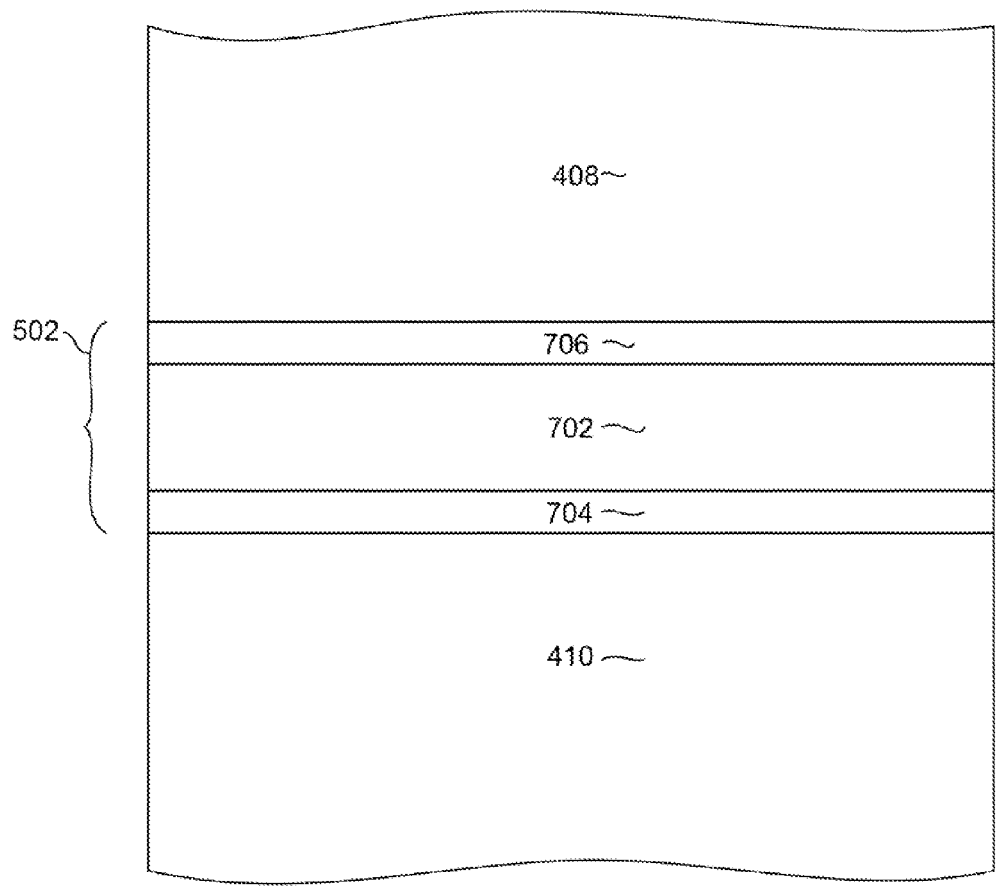
FIG. 7 is an enlarged view showing a diffusion barrier layer according to an alternate embodiment of the invention.

With this in mind, the diffusion barrier layer 502 can be constructed as a TaN or $Si_3N_4$ layer having a thickness of 5 nm or less. Alternatively, as shown in greater detail in FIG. 6 the diffusion barrier layer 502 can be a Rh or Ru layer 602 with a thickness of 4 nm or less with an adhesion layer 604 having a thickness of 1 nm or less sandwiched between the Rh or Ru layer and the $SiO_2$ aperture 410. The adhesion layer can be Ta, Cr or could be TaN. In another embodiment as shown in FIG. 7, the diffusion barrier layer 502 could be constructed with a layer of Rh or Ru 702 having a thickness of 3 nm or less sandwiched between first and second adhesion layers 704, 706 each having a thickness of 1 nm or less. Again, the adhesion layers 704, 706 could be Ta, Cr or could be TaN.

Figure 8:
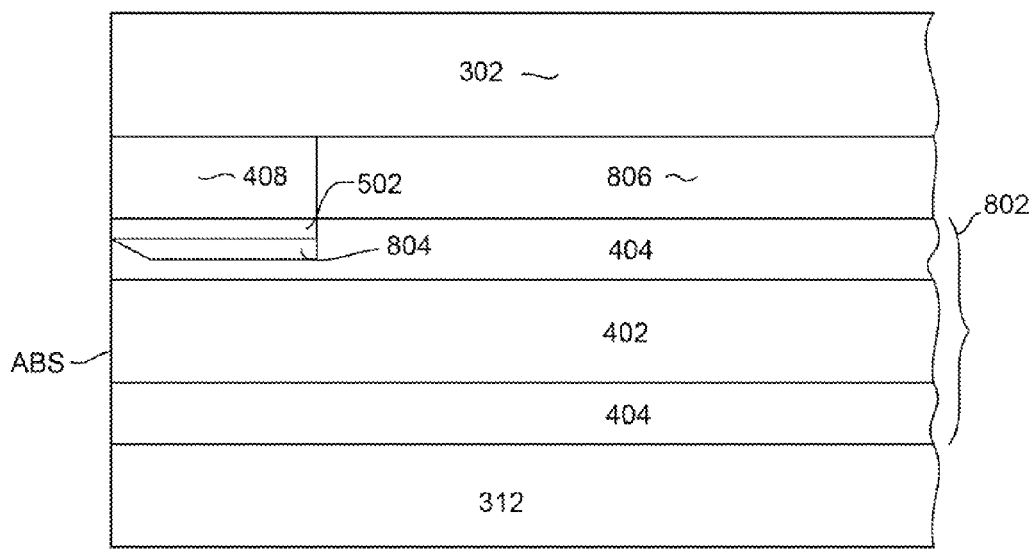
FIG. 8 is a cross sectional view of a write head showing a near field transducer heating element according to an alternate embodiment of the invention.
Figure 9:
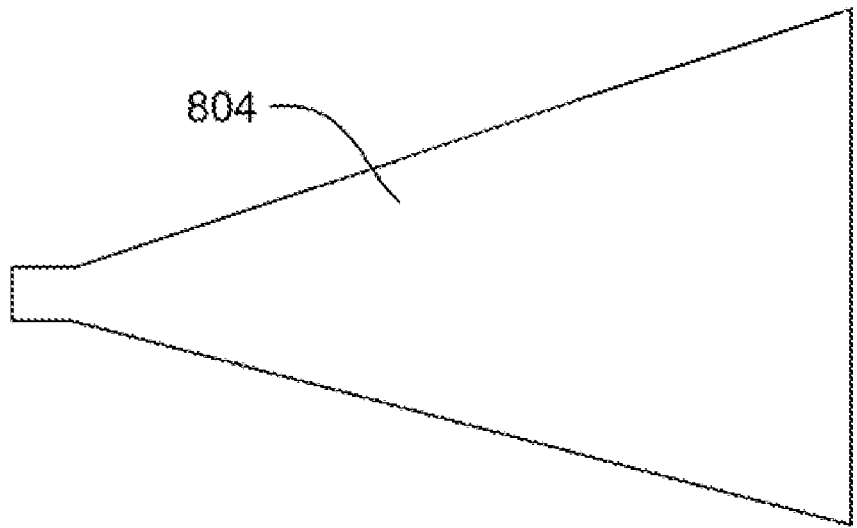
FIG. 9 is a top down view of a plasmonic antenna of a heating element from the embodiment of FIG. 8.

It should be pointed out that the above described plasmonic device separated from a magnetic lip with a diffusion barrier layer, discussed with reference to FIGS. 4 and 5 are by way of example only, and the invention could be incorporated into many other configurations of devices. The NFT (antenna or aperture) is separated from the magnetic lip by the diffusion layer which is sandwiched therebetween. The NFT (whether antenna or aperture) can be of various configurations. For example, a device could be constructed having an antenna 406 adjacent to a magnetic lip 408, with a diffusion barrier 502, such as the ones discussed above, sandwiched between the antenna 406 and the magnetic lip 408. In addition, the magnetic antenna 406 could have a shape other than that discussed above. For example, the antenna 406 could be a nano-beak design having a shape similar to a bird's beak, narrowing to a point at the air bearing surface. FIGS. 8 and 9 illustrate another possible embodiment of the invention where the antenna is a nano-beak antenna. The nano-beak antenna is located within the cladding material 404 adjacent to and separated from the magnetic lip 408 by a diffusion barrier layer 502, which may be constructed of a material or materials described above. The length of the nano-beak metal and the diffusion barrier layer, as measured from the ABS, is same as the length of the magnetic lip 408 as shown in FIG. 8. As can be seen, the antenna 804 has a tapered point at the ABS. The wave guide 802 can be separated from the upper return pole 302 by a non-magnetic spacer layer 806. A top down view of the antenna is shown in FIG. 9, wherein it can be seen that the antenna 804 also narrows to a point at the ABS as viewed from the top down. Light traveling through the waveguide 402 is drawn to the antenna forming an extremely focused hot spot at the pointed tip of the antenna 804. Again, heat from this hot stop could cause diffusion between the antenna 804 and the magnetic lip 408. However, this diffusion is prevented by the presence of the diffusion barrier layer 502 there-between. Therefore, the presence of the diffusion barrier layer 502 provides the same advantage in this presently described embodiment as it did in the previously described embodiment.

Other antenna shapes include lollipop shape, a bow tie shape or a two-rod antenna. Similarly, the shape or configuration of the aperture 410 could vary as well. For example, the aperture could have a "C" shape, a triangular shape or could be configured as a ridge waveguide aperture. In addition, the NFT could be a Very Small Aperture Laser (VSAL).

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A thermally assisted magnetic write head, comprising:
    a near field transducer comprising a metallic E-shaped antenna comprising Au, Ag, Cu, Al, Rh or Pt and an dielectric C-shaped aperture comprising $SiO_2$, $Si_3N_4$ or $SiO_xN_y$;
    a magnetic pole;
    a magnetic lip connected with the magnetic pole; and
    a diffusion barrier layer sandwiched between the near field transducer and the magnetic lip.

2. The thermally assisted magnetic write head as in claim 1 wherein the diffusion barrier layer comprises TaN, TiN, ZrN, HfN, NbN, CrN, VN, TiC, TaC, WC, SiC or $Si_3N_4$ layer and has a thickness of 5 nm or less.

3. The thermally assisted magnetic write head as in claim 1 wherein the diffusion barrier layer comprises a layer of noble metals such as Rh, Ru, Pd, Au, Ag, Pt or Ir having thickness of 4 nm or less and an adhesion layer of Ta, Cr, TaN, TiN, ZrN, HfN, NbN, CrN, VN or $Si_3N_4$ having thickness of 1 nm or less sandwiched between the layer of Rh or Ru and the near field transducer.

4. The thermally assisted magnetic write head as in claim 1 wherein the diffusion barrier layer comprises a layer of noble metal having thickness of 4 nm or less sandwiched between first and second adhesion layers each comprising Ta, Cr, TaN, TiN, ZrN, HfN, NbN, CrN, VN or $Si_3N_4$ with each adhesion layer having a thickness of 1 nm or less.

5. A thermally assisted magnetic write head, comprising:
    a near field transducer comprising a triangle-shaped beaked antenna comprising Au, Ag, Cu, Al, Rh or Pt which is tapered at the ABS;
    a magnetic pole;
    a magnetic lip connected magnetically to the magnetic pole; and
    a diffusion barrier layer sandwiched between the near field transducer and the magnetic lip.

6. The thermally assisted magnetic write head as in claim 5 wherein the diffusion barrier layer comprises TaN, TiN, ZrN, HfN, NbN, CrN, VN, TiC, TaC, WC, SiC or $Si_3N_4$ layer and has a thickness of 5 nm or less.

7. The thermally assisted magnetic write head as in claim 5 wherein the diffusion barrier layer comprises a layer of noble metal having thickness of 4 nm or less and an adhesion layer of Ta, Cr, TaN, TiN, ZrN, HfN, NbN, CrN, VN or $Si_3N_4$ having thickness of 1 nm or less sandwiched between the layer of Rh or Ru and the near field transducer.

8. The thermally assisted magnetic write head as in claim 5 wherein the diffusion barrier layer comprises a layer of noble metal having thickness of 4 nm or less sandwiched between first and second adhesion layers comprising of Ta, Cr, TaN, TiN, ZrN, HfN, NbN, CrN, VN or $Si_3N_4$ with each adhesion layer having a thickness of 1 nm or less.

9. A thermally assisted magnetic write head, comprising:
    a near field transducer comprising a lollipop-shaped metallic antenna comprising Au, Ag, Cu, Al, Rh or Pt;
    a magnetic pole;
    a magnetic lip connected magnetically to the magnetic pole; and
    a diffusion barrier layer sandwiched between the tip of the near field transducer and the magnetic lip.

10. The thermally assisted magnetic write head as in claim 9 wherein the diffusion barrier layer comprises TaN, TiN, ZrN, HfN, NbN, CrN, VN, TiC, TaC, WC, SiC or $Si_3N_4$ layer and has a thickness of 5 nm or less.

11. The thermally assisted magnetic write head as in claim 9 wherein the diffusion barrier layer comprises a layer of noble metal having a thickness of 4 nm or less and an adhesion layer of Ta, Cr, TaN, TiN, ZrN, HfN, NbN, CrN, VN or $Si_3N_4$ having thickness of 1 nm or less sandwiched between the layer of Rh or Ru and the near field transducer.

12. The thermally assisted magnetic write head as in claim 9 wherein the diffusion barrier layer comprises a layer of noble metal having thickness of 4 nm or less sandwiched between first and second adhesion layers comprising of Ta, Cr, TaN, TiN, ZrN, HfN, NbN, CrN, VN or Si3N4 with each adhesion layer having a thickness of 1 nm or less.

13. A thermally assisted magnetic write head, comprising:
    a near field transducer;
    a magnetic pole; and
    a diffusion barrier layer sandwiched between the near field transducer and the magnetic pole;
    wherein the near field transducer is a plasmonic device that includes a metallic antenna, and wherein the diffusion barrier layer is sandwiched between the metallic antenna and the magnetic lip.

14. A thermally assisted magnetic write head, comprising:
    a near field transducer;
    a magnetic pole; and
    a diffusion barrier layer sandwiched between the near field transducer and the magnetic pole;
    wherein the near field transducer is a lollipop shaped metallic antenna, and wherein the diffusion barrier layer is sandwiched between the metallic antenna and the magnetic lip.

15. A thermally assisted magnetic write head, comprising:
    a near field transducer;
    a magnetic pole; and
    a diffusion barrier layer sandwiched between the near field transducer and the magnetic pole;
    wherein the near field transducer is a plasmonic device that includes a metallic antenna and an aperture, and wherein the diffusion barrier layer is sandwiched between the aperture and the magnetic lip.

16. A thermally assisted magnetic write head, comprising:
    a near field transducer;
    a magnetic pole; and
    a diffusion barrier layer sandwiched between the near field transducer and the magnetic pole;
    wherein the diffusion barrier layer comprises TaN, TiN, ZrN, HfN, NbN, CrN, VN, TiC, TaC, WC, SiC or $Si_3N_4$ layer and has a thickness of 5 nm or less.

17. A thermally assisted magnetic write head, comprising:
    a near field transducer;
    a magnetic pole; and
    a diffusion barrier layer sandwiched between the near field transducer and the magnetic pole;

wherein the diffusion barrier layer comprises a layer of noble metals such as Rh, Ru, Pd, Au, Ag, Pt or Ir having thickness of 4 nm or less and an adhesion layer of Ta, Cr, TaN, TiN, ZrN, HfN, NbN, CrN, VN or $Si_3N_4$ having thickness of 1 nm or less sandwiched between the layer of Rh or Ru and the near field transducer.

18. A thermally assisted magnetic write head, comprising:
a near field transducer;
a magnetic pole; and
a diffusion barrier layer sandwiched between the near field transducer and the magnetic pole;
wherein the diffusion barrier layer comprises a layer of noble metal having thickness of 4 nm or less sandwiched between first and second adhesion layers comprising of Ta, Cr, TaN, TiN, ZrN, HfN, NbN, CrN, VN or $Si_3N_4$ with each adhesion layer having a thickness of 1 nm or less.

19. A thermally assisted magnetic write head, comprising:
a near field transducer;
a magnetic pole; and
a diffusion barrier layer sandwiched between the near field transducer and the magnetic pole;
wherein the near field transducer includes an aperture comprising a dielectric material having a refractive index less than 1.75, wherein the diffusion barrier layer is sandwiched between the aperture and the magnetic lip.

20. A thermally assisted magnetic write head, comprising:
a near field transducer;
a magnetic pole; and
a diffusion barrier layer sandwiched between the near field transducer and the magnetic pole;
wherein the near field transducer includes an aperture comprising SiOx, SiNx, SiOxNy or $Al_2O_3$.

21. A thermally assisted magnetic write head, comprising:
a near field transducer;
a magnetic pole; and
a diffusion barrier layer sandwiched between the near field transducer and the magnetic pole;
wherein near field transducer comprises a metallic antenna configured with a notch and an aperture, the aperture being located between the metallic antenna and the magnetic lip, the diffusion barrier being sandwiched between the aperture and the magnetic lip.

22. A thermally assisted magnetic write head, comprising:
a near field transducer;
a magnetic pole; and
a diffusion barrier layer sandwiched between the near field transducer and the magnetic pole;
wherein the diffusion barrier layer comprises TaN, TiN, ZrN, HfN, NbN, CrN, VN, TiC, TaC, WC, SiC or $Si_3N_4$ layer and has a thickness of 5 nm or less.

23. A thermally assisted magnetic write head, comprising:
a near field transducer;
a magnetic pole; and
a diffusion barrier layer sandwiched between the near field transducer and the magnetic pole;
wherein the diffusion barrier layer comprises a layer of noble metals such as Rh, Ru, Pd, Au, Ag, Pt or Ir having thickness of 4 nm or less and an adhesion layer of Ta, Cr, TaN, TiN, ZrN, HfN, NbN, CrN, VN or $Si_3N_4$ having thickness of 1 nm or less sandwiched between the layer of Rh or Ru and the near field transducer.

24. A thermally assisted magnetic write head, comprising:
a near field transducer;
a magnetic pole; and
a diffusion barrier layer sandwiched between the near field transducer and the magnetic pole;
wherein the diffusion barrier layer comprises a layer of noble metals such as Rh, Ru, Pd, Au, Ag, Pt or Ir having thickness of 4 nm or less sandwiched between first and second adhesion layers comprising of Ta, Cr, TaN, TiN, ZrN, HfN, NbN, CrN, VN or $Si_3N_4$ with each adhesion layer having a thickness of 1 nm or less.

\* \* \* \* \*